United States Patent [19]

Taeuber, Jr. et al.

[11] Patent Number: 5,383,694
[45] Date of Patent: Jan. 24, 1995

[54] LOAD SEGMENT ASSEMBLY WITH WIRE ROPE

[75] Inventors: Ralph Taeuber, Jr., Houston; Sergio A. Castillo, Jr., Spring; Robert H. Ash, Jr., Humble, all of Tex.

[73] Assignee: FMC Corporation, Chicago, Ill.

[21] Appl. No.: 10,915

[22] Filed: Jan. 29, 1993

[51] Int. Cl.⁶ .................. F16L 19/02; F16L 27/00
[52] U.S. Cl. ..................... 285/374; 285/276; 285/305; 285/415; 285/321
[58] Field of Search ........... 285/276, 374, 277, 141, 285/144, 305, 308, 318, 321, 415

[56] References Cited

U.S. PATENT DOCUMENTS

| | | | |
|---|---|---|---|
| 3,910,566 | 10/1975 | Pedersen et al. | 285/276 |
| 3,929,358 | 12/1975 | Eckhardt | 285/415 |
| 4,498,874 | 2/1985 | Pichl | 285/305 |
| 4,730,852 | 3/1988 | Waits | 285/14 |
| 4,805,943 | 2/1989 | Balstells | 285/321 |
| 4,850,622 | 7/1989 | Suzuki | 285/308 |
| 4,867,483 | 9/1989 | Witt et al. | |
| 4,927,192 | 5/1990 | Ungchusri et al. | |
| 5,005,877 | 4/1991 | Hayman | 285/321 |
| 5,149,148 | 9/1992 | Taeuber, Jr. et al. | |
| 5,163,712 | 11/1992 | Sabo et al. | 285/276 |
| 5,247,996 | 9/1993 | Milberger | 285/141 |

Primary Examiner—Eric K. Nicholson
Attorney, Agent, or Firm—Lawrence Cruz

[57] ABSTRACT

A load segment assembly for use in pipe swivel joints or pipe connectors locks male and female hubs of a joint together while providing an axial bearing therebetween. The load assembly includes arcuate segments each having a dove-tail groove on the face of the convex side of the arcuate segment, requiring a flexible joining member to be threaded therethrough, providing maximum shear and bearing strength.

13 Claims, 3 Drawing Sheets

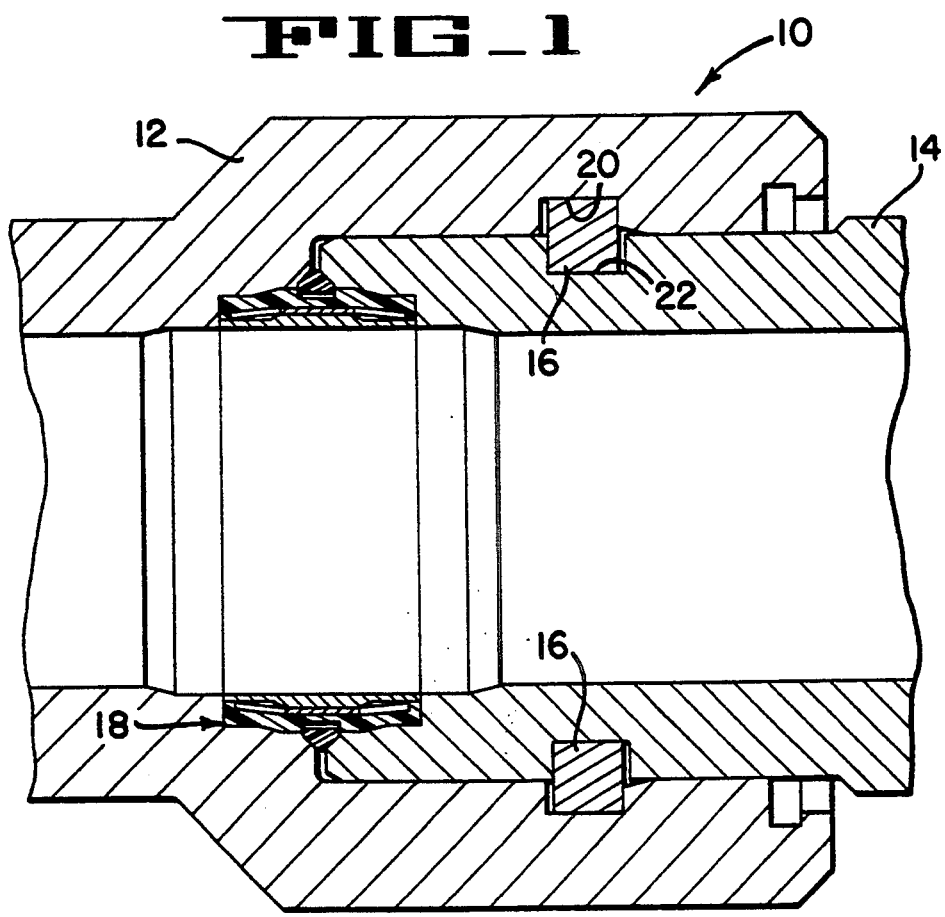
FIG_1
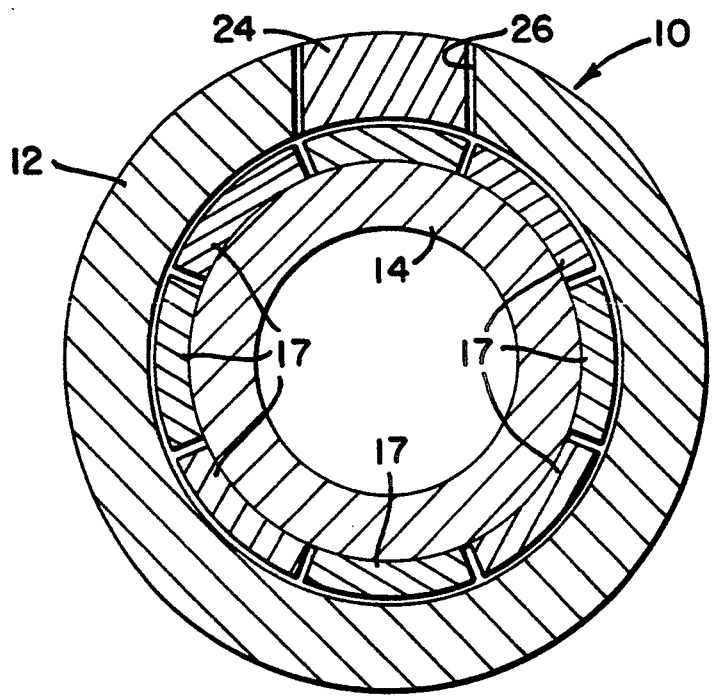
FIG_2

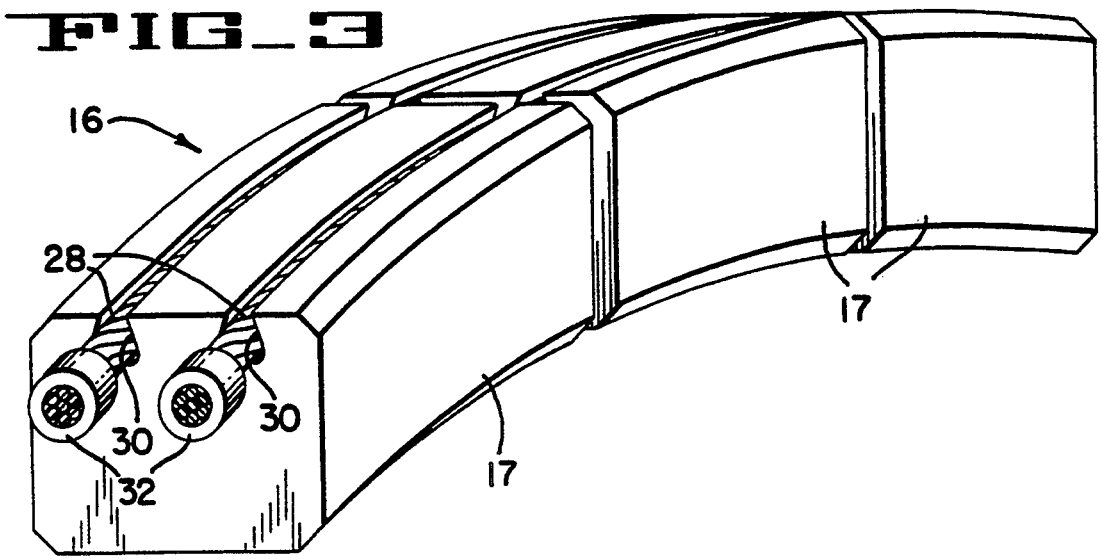
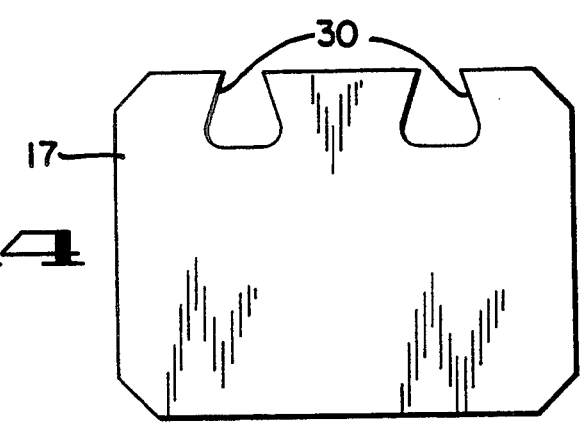
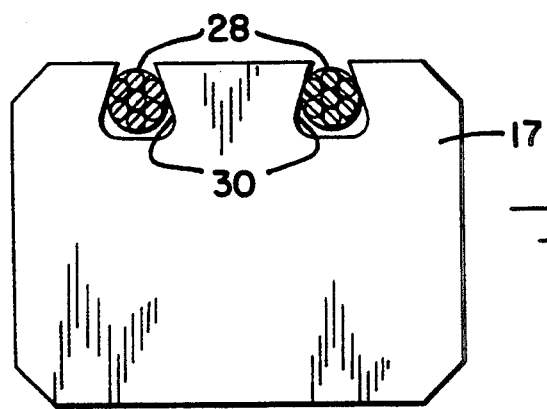

FIG_6
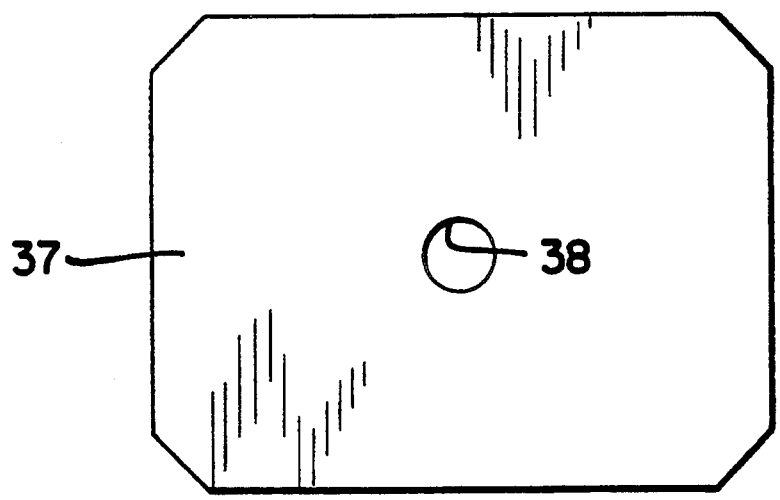
FIG_7
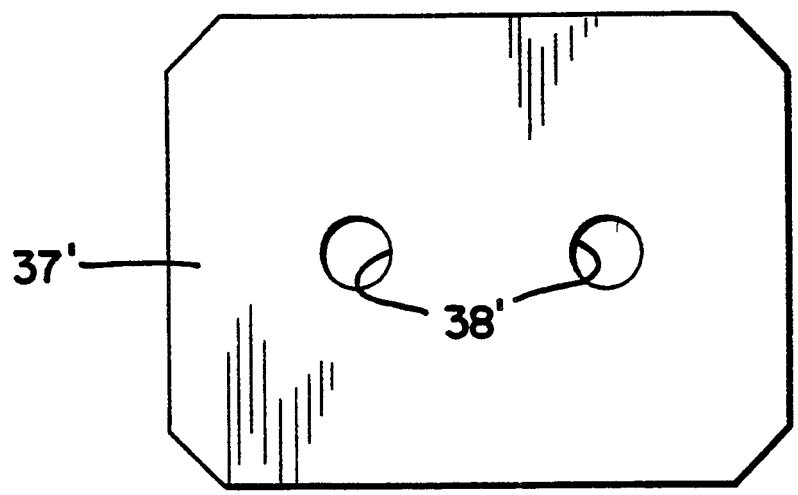

LOAD SEGMENT ASSEMBLY WITH WIRE ROPE

BACKGROUND OF THE INVENTION

This invention relates to pipe connector devices and, more particularly to pipe connector devices for use in temporary and quasi-permanent pipe flowlines.

Temporary and permanent flowlines are commonly used in production, drilling, cementing, and testing of oil and gas wells. Flexible devices with quick connections at the ends provide quick and convenient layout of the piping system and provide fluid tight seals between mating pipe element members. Commonly used flexible devices are swivel joints, hoses, composite structure pipe, and ball joints.

Swivel joints often involve the joining of two components having complementary male and a female hubs which interfit to form a seal while allowing rotational freedom. The two components must provide a tight seal that is capable of withstanding high pressures under harsh environmental conditions while enabling freedom of movement. Ordinarily, some type of sealing and load bearing elements are provided between the two joined components. Segmented load assemblies, sold under the trademark DYNETOR, provide a locking mechanism and sere as an axial bearing between male and female hub elements of a swivel joint. Such segmented load assemblies can be easily installed through a port in the body of one of the joined components. To facilitate this type of installation, the segments are flexibly joined, forming an assembly, so that they can be easily handled and will not be lost or miscounted.

At least one prior art device, disclosed in U.S. Pat. No. 4,927,192, utilizes a flexible ribbon to join segments in a load-bearing device for use in a flexible coupling. This design has several drawbacks. First, the cross-sectional profile of the ribbon does not allow free relative rotation between the segments and the ribbon so that during installation, removal, and other handling, incidental rotation of segments causes the ribbon to twist, limiting the freedom of rotation between segments and applying forces that may damage or tear the ribbon. Second, since the segmented load-bearing device is removed from the coupling by pulling on the ribbon, the ribbon needs to have significant tensile strength in order to pull the entire segmented device out in one piece. The cross-sectional profile of the ribbon greatly limits tensile strength.

SUMMARY OF THE INVENTION

It is an object, therefore, of the present invention to provide a load segment assembly that overcomes the above-mentioned drawbacks of the prior art and provides a load segment assembly that is generally stronger and more durable than prior known devices under bending and twisting conditions.

The present invention includes load segment assemblies for use in pipe swivel joints or pipe connectors. In use with swivel joints, the load segment assemblies of the present invention perform two functions. First, the load segment assemblies lock male and female hubs of a swivel joint together. Second, an installed load segment assembly serves as an axial bearing between the male and female hubs of a swivel joint. The load segment assemblies can be used with connectors and swivel joints both sold under the trademark DYNETOR.

The load assemblies include individual arcuate segments each having a groove on the face of the convex side of the arcuate segment. The groove on each segment has a dove-tail profile that is wider at the bottom than at the top. This profile allows a flexible wire rope to be threaded through each of a plurality of segments to form one assembly of end-to-end segments threaded on a single, closed loop wire rope. While the load segments can also be joined by drilling holes through individual segments for receiving the wire rope, the preferred embodiment having grooves on the surface of the segments ensures maximum shear strength and bearing strength because the grooves do not reduce the cross-sectional area of each segment in shear and bearing areas.

BRIEF DESCRIPTION OF THE DRAWINGS

FIG. 1 is a sectional view of a pipe swivel joint of the type with which the present invention can be used.

FIG. 2 is an end section of the pipe swivel joint of FIG. 1.

FIG. 3 is a perspective view of three arcuate load segments of a load segment assembly.

FIG. 4 is a sectional view of an arcuate load segment.

FIG. 5 is a sectional view of an arcuate load segment and wire rope installed in the grooves of the segment.

FIG. 6 is a sectional view of an alternative embodiment of an arcuate load segment.

FIG. 7 is a sectional view of another alternative embodiment of an arcuate load segment.

DETAILED DESCRIPTION OF THE DRAWINGS

A pipe swivel joint 10 is shown in FIG. 1 and includes a female hub 12, a male hub 14, a load segment assembly 16 comprised of individual arcuate segments 17 that locks the hubs 12, 14 together while facilitating relative rotation, and a bore seal assembly 18 that provides a seal between the hubs 12, 14. The female hub 12 and male hub 14 have grooves 20, 22 which are respectively aligned with each other to form a closed, annular passage between the two hubs 12, 14 for receiving the load segment assembly 16. The pipe swivel joint 10 is assembled by axially aligning the male and female hubs 12, 14 and pressing the two together to form an axial fit.

In FIG. 2, an end sectional view of the pipe swivel joint of FIG. 1 is shown. The female section 12 has a plug 24 removably received in a bore 26 that is in alignment with the grooves 20, 22 of the female and male hubs 12, 14. The plug 24 is removed from bore 26 to facilitate installation of the load segment assembly 16 into the grooves 20, 22. Each segment 17 of the load segment assembly 16 is fed through the bore 26 one at a time.

As shown in FIG. 3, the arcuate segments 17 are positioned end-to-end to form a load segment assembly 16. The segments 17 are held end-to-end by at least one wire rope 28 threaded through at least one groove 30 on a convex face of each arcuate segment 17. More than one wire rope 28 may be used for this purpose. The grooves 30 for receiving the wire rope 28 are tear-drop shaped in profile so that the top or outermost portion of the groove is more narrow than the bottom of the groove. The wire rope 28 is of a thickness greater than the narrow portion of the groove so that it cannot pass through the narrow portion. The segments 17 are assembled together by threading each one individually over wire rope 28 which has a crimped stop sleeve 32 at one end to prevent segments 17 from sliding off the wire rope 28. When the desired number of arcuate segments 17 have been threaded onto the wire rope, the other end of the wire rope is fitted with a crimped stop sleeve 32.

FIGS. 4 and 5 show a sectional view of an arcuate load segment 17 having two grooves 30 on the convex face of the arcuate segment 17. In FIG. 5 wire ropes 28 are shown in threaded position in each of the two grooves 28. Positioning of the grooves 30 on the convex surface of the arcuate load segment 17 ensures that the segment 17 has maximum shear strength and bearing strength because the location of the grooves 30 does not reduce the cross section of the segment in shear and bearing areas.

Another advantage of positioning the grooves 30 on the surface of the arcuate load segments 17 is that the segments 17 can be machined by a simple turning process. The arcuate load segments 17 are produced by first machining a ring or donut to the profile of the load segments 17, including one or more continuous grooves 30, as shown in FIGS 4 and 5. The ring is then segmented into the individual arcuate load segments 17.

An alternative embodiment of an arcuate segment 37 is shown in FIG. 6. In this embodiment, a hole 38 is provided for receiving wire rope 28. The hole 38 is positioned inwardly from the outer surfaces of the arcuate load segment 37. Similarly, in FIG. 7, an arcuate load segment 37 ' is provided with a plurality of holes 38' for receiving wire rope 28.

Although the best mode contemplated for carrying out the invention has been herein shown and described, it will be apparent that modification and variation may be made without departing from what is regarded to be the subject matter of the invention.

I claim:

1. A load segment assembly for use as a bearing and locking member in a pipe swivel joint or connector comprising:
   a plurality of arcuate load segments, each having opposed end faces, a concave face, and a convex face;
   wherein said plurality of arcuate load segments are positioned end-to-end and joined by at least one flexible, elongate joining member such that said convex and concave faces of consecutive arcuate load segments align on the same sides respectively and are flexibly joined enabling relative displacement and rotation between said arcuate load segments; and
   wherein said joining member is received on each arcuate segment in a groove on said convex face, each said groove having a dove-tail shaped profile; and
   wherein each corresponding groove is sized relative to said joining member such that insertion of said joining member into each said groove requires said joining member to be threaded into each said groove at an end face of each load segment.

2. A load segment assembly according to claim 1 wherein
   said joining member has a generally round cross section.

3. A load segment assembly according to claim 1 wherein
   said joining member comprises a wire rope.

4. A load segment assembly according to claim 1 wherein
   said joining member is provided with stop means for preventing said arcuate load segments from sliding off the ends of said joining member.

5. A load segment assembly according to claim 1, 2, or 3 wherein
   said joining member is threaded through a hole extending between said opposed end faces of each of said arcuate load segments.

6. A load segment assembly according to claim 1 wherein
   said arcuate segments are joined by a plurality of flexible, elongate joining members.

7. A load segment assembly according to claim 6 wherein
   each said joining member has a generally round cross section.

8. A load segment assembly according to claim 6 wherein
   each said joining member comprises a wire rope.

9. A load segment assembly according to claim 6, 7, or 8 wherein
   each said joining member is received on each arcuate segment in a groove on said convex face.

10. A load segment assembly according to claim 6 wherein
    each said joining member is provided with stop means for preventing said arcuate load segments from sliding off the ends of said joining member.

11. A load segment assembly according to claim 9 wherein
    said groove on said convex face is of a dove-tail shaped profile.

12. A load segment assembly according to claim 6, 7 or 8 wherein
    each said joining member is threaded through a hole extending between said opposed end faces of each of said arcuate load segments.

13. A method of making a load segment assembly for use as a bearing and locking member in a pipe swivel joint or connector, comprising the steps of:
    forming a ring-shaped member to a desired profile;
    forming one or more continuous grooves on the outer circumferential surface of said ring-shaped member, wherein said one or more continuous grooves is formed with a dove-tail shaped profile and each corresponding groove is sized relative to said joining member such that insertion of said joining member into each said groove requires said joining member to be threaded into each said groove at an end face of each load segment;
    dividing said ring-shaped member into individual arcuate segments; and
    threading one or more flexible, elongated joining members through said one or more grooves to flexibly join said arcuate segments in an end-to-end manner.

* * * * *